United States Patent [19]

Hart, Jr. et al.

[11] 4,054,505
[45] Oct. 18, 1977

[54] METHOD OF REMOVING BITUMEN FROM TAR SAND FOR SUBSEQUENT RECOVERY OF THE BITUMEN

[75] Inventors: Louis I. Hart, Jr., Littleton; Josef J. Schmidt-Collerus, Denver, both of Colo.; Larry R. Burroughs, Calgary, Canada

[73] Assignee: Western Oil Sands Ltd., Denver, Colo.

[21] Appl. No.: 681,163

[22] Filed: Apr. 28, 1976

[51] Int. Cl.$^2$ .............................................. C10G 1/04
[52] U.S. Cl. ............................................... 208/11 LE
[58] Field of Search ................................... 208/11 LE

[56] References Cited

U.S. PATENT DOCUMENTS

| 2,973,312 | 2/1961 | Logan | 208/11 LE |
| 3,017,342 | 1/1962 | Bulat et al. | 208/11 LE |
| 3,123,546 | 3/1964 | Bodine | 208/11 LE |
| 3,553,099 | 1/1971 | Savage et al. | 208/11 LE |
| 3,925,189 | 12/1975 | Wicks | 208/11 LE |

FOREIGN PATENT DOCUMENTS

| 633,063 | 12/1961 | Canada | 208/11 LE |

Primary Examiner—Delbert E. Gantz
Assistant Examiner—James W. Hellwege
Attorney, Agent, or Firm—Ancel W. Lewis, Jr.

[57] ABSTRACT

A method of removing bitumen from tar sand for subsequent recovery of the bitumen. The method comprises submerging tar sand in a sufficient amount of a circulating solvent in which the bitumen is soluble, and, while the tar sand is so submerged, sonicating within the solvent with a sufficient amount of sonic energy to break apart any connections between sand granules and to remove bitumen from the sand granules to thereby permit the bitumen so removed to go into solution in the solvent for subsequent removal of the solvent-plus-bitumen and recovery of the bitumen therefrom.

5 Claims, No Drawings

METHOD OF REMOVING BITUMEN FROM TAR SAND FOR SUBSEQUENT RECOVERY OF THE BITUMEN

BACKGROUND OF THE INVENTION

Tar sand is composed of a mixture of viscous hydrocarbon compounds, known as bitumen, occupying pore space within rocks such as sandstone, dolomite, and loose sedimentary deposits, with the particles thereof essentially being bitumen in varying amounts adsorbed on sand granules. Deposits of tar sand are found in the ground in many areas of the world, and are removed from the earth through utilization of mining techniques known in the art for subsequent removal and recovery of the bitumen for refining into usable petroleum products.

Current usual methods employed in the removal of bitumen from tar sand are three in number, and include hot water extraction, pyrolysis, and solvent extraction. Hot water extraction involves heating tar sand with steam, hot water, and sodium hydroxide in separation tanks wherein the sand falls to the bottom and the bitumen floats to the top and is then removed for reclamation.

Pyrolysis consists of partial combustion of the tar sand to decompose the bitumen molecules into gases and liquids for subsequent recovery and refinement.

The solvent extraction method involves mixing tar sand with a solvent in which bitumen is soluble, and then removing the solvent-plus-bitumen from the remaining sand for subsequent recovery of the bitumen. For this method to be successful, however, a considerable length of time is required for the solvent to be in contact with the tar sand in order to remove a beneficial amount of bitumen, thus producing a costly low throughput of material and low reclamation of bitumen per unit of time even when stirring, refluxing, or other such mechanical means are utilized.

The invention disclosed herein, however, discloses a method of removing bitumen from tar sand in a relatively short period of time to yield a relatively high, and thus efficient, throughput of material and resulting reclamation potential of bitumen per unit of time. The method comprises submerging tar sand in a sufficient amount of a circulating solvent in which the bitumen is soluble, and, while the tar sand is so submerged, sonicating within the solvent with a sufficient amount of sonic energy to break apart any connections between sand granules and to remove bitumen from the said granules to permit the bitumen so removed to go into solution in the solvent for subsequent removal of the solvent-plus-bitumen and recovery of the bitumen therefrom.

SUMMARY OF THE INVENTION

The subject of this invention is a method of removing bitumen from tar sand for subsequent recovery of the bitumen. The method comprises submerging tar sand in a sufficient amount of a circulating solvent in which the bitumen is soluble, and, while the tar sand is so submerged, sonicating within the solvent with a sufficient amount of sonic energy to break apart any connections between sand granules and to remove bitumen from the sand granules to thereby permit the bitumen so removed to go into solution in the solvent for subsequent removal of the solvent-plus-bitumen and recovery of the bitumen therefrom.

In a preferred embodiment the solvent utilized is a mixture of ethylbenzene, ortho-xylene, meta-xylene, and para-xylene in a relation by volume respectively of 23%, 14%, 55%, and 8%. The percent relationship, however, is not critical, and any one of these alone or any mixture of two, three, or four of these can be utilized, as can any other solvent in which the bitumen is soluble. In the preferred embodiment the amount of solvent used in relation to the dead volume of the tar sand is 2:1, and the amount of sonic energy utilized is 600 kilocycles for 60 seconds for 110 grams of tar sand. Those skilled in the art will recognize that varying amounts of each of the above can be utilized to achieve the results of this invention.

DETAILED DESCRIPTION OF A PREFERRED EMBODIMENT

Disclosed herein is a method of removing bitumen from tar sand, the method comprising submerging tar sand in a sufficient amount of a circulating solvent in which the bitumen is soluble, and, while the tar sand is so submerged, sonicating within the solvent with a sufficient amount of sonic energy to break apart any connections between sand granules and to remove bitumen from the sand granules to thereby permit the bitumen so removed to go into solution in the solvent for subsequent removal of the solvent-plus-bitumen and recovery of the bitumen therefrom. The procedure employed in a preferred embodiment, and the results thereof, are shown as follows.

A chunk of tar sand weighing approximately 110 grams is placed in a beaker and covered with 50 ml (about 2 times the dead volume of the tar sand) of a solvent comprising a reagent grade mixture by volume of 23% ethylbenzene, 14% ortho-xylene, 55% meta-xylene, and 8% para-xylene. The solvent is kept stirred with a small stirring blade and a small stirring motor at a speed of 15 revolutions per minute. The stirring blade keeps the solvent circulating, but does not contact the tar sand. Immediately thereafter, a sonic head of one-half inch diameter is placed in the solvent and 600 kilocycles of sonic energy is applied for a period of 60 seconds to break apart any connections between sand granules and to concurrently remove from the sand granules bitumen which goes into solution in the solvent. The resulting solvent-plus-bitumen is then decanted for subsequent recovery of the bitumen. To indicate the effectiveness of the sonic energy, further experimentation is shown in Table I, below, comparing the bitumen recovered from the above decantation against four subsequent consecutive respective 30 ml amounts of the same solvent put in contact with the tar sand for respective 30 second periods and then respectively decanted. Acetone is used in Extraction No. 6 of Table I to remove all solvent from the remaining sand.

TABLE I

Extraction of Tar Sands at Ambient Temperature and Slow Stirring Utilizing Sonic Energy in the First Extraction

| Extraction No. | Amount of Solvent | Extraction Time | Extracted Bitumen (Wt. %) |
|---|---|---|---|
| 1 (Sonic used) | 50 ml | 60 sec. | 11.5 |
| 2 | 30 ml | 30 sec. | 13.4 |
| 3 | 30 ml | 30 sec. | 14.3 |
| 4 | 30 ml | 30 sec. | 14.4 |
| 5 | 30 ml | 30 sec. | 14.7 |
| 6 | 30 ml acetone | 30 sec. | 14.7 |

TABLE I-continued

Extraction of Tar Sands at Ambient Temperature and Slow Stirring Utilizing Sonic Energy in the First Extraction

| Extraction No. | Amount of Solvent | Extraction Time | Extracted Bitumen (Wt. %) |
|---|---|---|---|
| Total | 200 ml | 3.5 minutes | 14.7 |

Analysis of the above tar sand shows that the total amount of bitumen present originally by weight percent is 14.7 Table I shows that 78% of the total bitumen content was removed from the tar sand and in solution in the solvent 60 seconds after the procedure began.

To contrast the results shown in Table I, a second procedure, the currently known solvent extraction method, was undertaken using a second sample of tar sand, the same solvent, and the same amount of stirring, but without using sonic energy. The results of this procedure are shown in Table II, below.

TABLE II

Extraction of Tar Sands at Ambient Temperature and Slow Stirring Without Utilization of Sonic Energy

| Extraction No. | Amount of Solvent | Extraction Time | Extracted Bitumen (Wt. %) |
|---|---|---|---|
| 1 | 110 ml | 4 hours | 8.5 |
| 2 | 30 ml | 3 hours | 11.0 |
| 3 | 30 ml | 3 hours | 12.4 |
| 4 | 30 ml | 3 hours | 13.1 |
| 5 | 30 ml | 3 hours | 13.1 |
| 6 | 30 ml acetone | 3 hours | 13.5 |
| Total | 260 ml | 19 hours | 13.5 |

Analysis of the above tar sand shows that the total amount of bitumen present originally by weight percent is 13.5. Table II shows that even with additional solvent and 4 hours of contact of solvent with the tar sand, only 63% of the total bitumen content was removed from the tar sand and in solution in the solvent. Further, at Extraction No. 5, 16 hours into the procedure, a small amount of bitumen still had not been removed from the tar sand. This is contrasted to Extraction No. 5 of Table I wherein, after only three minutes into the procedure, all of the bitumen was removed from the tar sand.

Should it be necessary to return the spent bitumen-free sand granules to their source in the ground, the use of acetone as a final step, shown in both Table I and Table II, removes the solvent, whether it contain bitumen or be bitumen-free, from the sand granules to thus yield a pure sand which can be dried and returned to the earth without producing environmentally unsafe consequences.

While ambient temperature is utilized in the preferred embodiment, a greater or lesser temperature can be employed with resulting expected action to the compounds and components used. Likewise, the velocity of stirring for circulating the solvent can be increased or decreased as dictated by the circumstance presented. Of course, utilization of sonic energy within the solvent produces circulation of the solvent within the vessel containing the mixture of tar sand and solvent. Intensity and time of sonic energy application can likewise be adjusted as required by the situation to produce the results of this invention.

A production plant facility which yields a commercial volume of solvent-plus-bitumen utilizes three vessels, each fitted with at least one sonic energy producer, each containing tar sand, each having a stirring means, and each having circulating therethrough under pressure, via a countercurrent path, solvent. The vessels are selectively interconnected through utilization of valves and hoses through which the solvent is pumped into and out of respectively selected vessels. The solvent so pumped can thus be caused to flow in a countercurrent path identified herein as Steps 1, 2 and 3, with Step 1) introducing the least spent solvent (fresh solvent) to the vessel containing tar sand having the least amount of bitumen because of earlier processing in Steps 2 and 3; Step 2) introducing the partially spent solvent from Step 1 to the vessel containing tar sand having a partial amount of bitumen previously removed because of earlier processing in Step 3; and Step 3) introducing the most spent solvent from Step 2 to the vessel containing tar sand having the greatest amount of bitumen. Greatest utilization of the sonic energy is achieved when the sonic energy is applied at Step 2, above, at an intensity and duration relative to the need of the particular tar sand being processed. At Step 3 of the countercurrent path the tar sand then being treated has not yet been subjected to sonication. The solvent has not yet been subjected to sonication. The solvent introduction at Step 3 is done primarily to permit said solvent to act as a primer before sonication occurs at Step 2.

At each of Steps 1, 2, and 3, the solvent is permitted to remain in contact with the tar sand for the period of time needed by the particular tar sand being processed to achieve the greatest economical bitumen removal. At the conclusion of Step 3, the solvent-plus-bitumen is pumped from the vessel in which Step 3 occurred to a distillation apparatus which distills off the solvent for collection and re-use and leaves the bitumen for subsequent processing. At the conclusion of Step 1, the remaining bitumen-free sand granules in the vessel in which Step 1 took place are removed and can then be treated with acetone as desired to remove any remaining solvent.

We claim:

1. A method of removing bitumen from tar sand for subsequent recovery of the bitumen, the method comprising submerging tar sand in a sufficient amount of a circulating solvent in which the bitumen is soluble, and, while the tar sand is so submerged, stirring the circulating solvent and sonicating within the solvent with a sufficient amount of sonic energy to break apart any connection between sand granules and to remove bitumen from the sand granules so that the bitumen so removed can go into solution in the solvent for subsequent removal of the solvent-plus-bitumen and recovery of the bitumen therefrom.

2. A method of removing bitumen from tar sand as claimed in claim 1 wherein the solvent is a mixture of any combination of ethylbenzene, ortho-xylene, meta-xylene, and para-xylene.

3. A method of removing bitumen from tar sand as claimed in claim 2 wherein the mixture of ethylbenzene, ortho-xylene, meta-xylene, and para-xylene is in a relation by volume respectively of 23% ethylbenzene, 14% orthoxylene, 55% meta-xylene, and 8% para-xylene.

4. A method of removing bitumen from tar sand as claimed in claim 1 wherein the method is performed at ambient temperature.

5. A method of removing bitumen from tar sand as claimed in claim 1 wherein the amount of solvent is two times the dead volume of the tar sand.

* * * * *